United States Patent
Magri et al.

(10) Patent No.: US 10,819,459 B2
(45) Date of Patent: Oct. 27, 2020

(54) NETWORK NODE AND METHOD

(71) Applicant: Telefonaktiebolaget LM Ericsson (publ), Stockholm (SE)

(72) Inventors: Roberto Magri, Pisa (IT); Alberto Deho, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/088,404

(22) PCT Filed: Apr. 1, 2016

(86) PCT No.: PCT/EP2016/057261
§ 371 (c)(1),
(2) Date: Sep. 25, 2018

(87) PCT Pub. No.: WO2017/167400
PCT Pub. Date: Oct. 5, 2017

(65) Prior Publication Data
US 2019/0393973 A1    Dec. 26, 2019

(51) Int. Cl.
*H04J 14/02* (2006.01)

(52) U.S. Cl.
CPC ...... *H04J 14/0209* (2013.01); *H04J 14/0206* (2013.01); *H04J 14/0208* (2013.01);
(Continued)

(58) Field of Classification Search
CPC ...... H04J 14/02; H04J 14/0212; H04J 14/021; H04J 14/0221; H04B 10/032;
(Continued)

(56) References Cited

U.S. PATENT DOCUMENTS

2003/0039003 A1    2/2003  Jakobik et al.
2003/0063343 A1    4/2003  Pheiffer et al.
(Continued)

FOREIGN PATENT DOCUMENTS

DE    102 48 059 A1    5/2004
WO    03 052978 A1     6/2003

OTHER PUBLICATIONS

Ericsson Fronthaul 6080 Family; Ericsson Radio System, Ericsson Radio System Hardware, Ericsson Fronthaul—Nov. 3, 2016.
(Continued)

*Primary Examiner* — Hanh Phan
(74) *Attorney, Agent, or Firm* — Sage Patent Group

(57) ABSTRACT

A network node (400) for use as a hub node of a network that further comprises one or more remote nodes, wherein the network node (400) is coupled to at least first and second connections (410, 412) for communication with one or more remote nodes, comprises a first band filter (403) adapted to separate a first aggregated signal (404) comprising a plurality of channel signals into a plurality of band signals (408₁ to 408_M). The network node (400) comprises a second band filter (405) and a third band filter (407) adapted to aggregate a plurality of band signals (408₁ to 408_M) into a second aggregated signal (406) comprising a plurality of channel signals and a third aggregated signal (413) comprising a plurality of channel signals, respectively. A switching module (409) is adapted to switch on a per-band granularity the plurality of band signals (408₁ to 408_M) between the first band filter (403) and either the second band filter (405) or the third band filter (407). The first band filter (403) may be adapted to aggregate the plurality of band signals (4081 to 408M) into the first aggregated signal (404); the second band filter (405) and a third band filter (407) may be adapted to separate the second aggregated signal (410) and third aggregated signal (412), respectively, into the plurality of
(Continued)

band signals ($408_1$ to $408_M$); and the switching module (409) may be adapted to switch on a per-band granularity the plurality of band signals ($408_1$ to $408_M$) between either the second band filter (405) or the third band filter (407) and the first band filter (403).

17 Claims, 9 Drawing Sheets

(52) U.S. Cl.
CPC ...... *H04J 14/0212* (2013.01); *H04J 14/0213* (2013.01); *H04J 14/0291* (2013.01)

(58) Field of Classification Search
CPC ............. H04B 10/035; H04Q 11/0003; H04Q 11/0005; H04Q 11/0062; H04Q 11/0066; H04Q 11/0067
USPC ........ 398/79, 83, 85, 87, 82, 45, 48, 49, 50, 398/59, 33, 10, 3, 4, 5, 13, 17, 38; 385/24, 37, 16, 17, 18
See application file for complete search history.

(56) References Cited

U.S. PATENT DOCUMENTS

| | | | | |
|---|---|---|---|---|
| 2003/0215238 | A1* | 11/2003 | Milton | H04J 14/0206 398/83 |
| 2005/0084262 | A1* | 4/2005 | Oberg | H04B 10/032 398/19 |
| 2009/0232497 | A1* | 9/2009 | Archambault | H04J 14/0206 398/50 |

OTHER PUBLICATIONS

PCT International Search Report for International application No. PCT/EP2016/057261—dated Nov. 24, 2016.

PCT Written Opinion of The International Searching Authority for International application No. PCT/EP2016/057261—dated Nov. 24, 2016.

\* cited by examiner

NETWORK NODE AND METHOD

PRIORITY

This nonprovisional application is a U.S. National Stage Filing under 35 U.S.C. § 371 of International Patent Application Serial No. PCT/EP2016/057261 filed Apr. 1, 2016, and entitled "Network Node and Method" which is hereby incorporated by reference in its entirety.

TECHNICAL FIELD

The embodiments described herein relate to a network node and method, and in particular to a network node and method for use as a hub node of a network such as a ring network, or a network node and method for use as a remote node of a network such as a ring network, for example in an optical communications network.

BACKGROUND

In communication networks, for example optical communication networks, rings are natural topologies that are used to offer resilience or protection. In an access network configured to operate for example using a Dense Wavelength Division Multiplexing (DWDM) technique, a DWDM ring configuration may be based on a hub node which communicates with all the remote nodes distributed around the ring. Each remote node operates in a specific wavelength band.

This configuration is particularly suitable for Mobile Front-Haul access networks, for example as shown in FIG. 1, where a number of remote antenna sites $10_2$ to $10_N$ are connected to a main site or hub node $10_1$ (where the digital processing may be performed). The main site or hub node $10_1$ is coupled to the remote nodes $10_2$ to $10_N$ via a ring network 30. The remote nodes $10_2$ to $10_N$ may comprise, for example, Optical Add Drop Multiplexers (OADMs). The remote nodes $10_2$ to $10_N$ may be coupled, for example, to Remote Radio Units (RRUs). The main site or hub node $10_1$ may be connected, for example, to a mobile unit 20 forming part of a Mobile Front-Haul access network in a telecommunication system. The hub node $10_1$ may be connected to a baseband processing unit, which may also be termed a main unit or digital unit.

Protection in a ring system requires the capability to switch the traffic destined to each remote node $10_2$ to $10_N$ to both east and west directions from the main hub node $10_1$. One switch serving the whole aggregate (as in a point-to-point line protection arrangement) is not feasible since the fault can be in any ring section, and therefore some remote nodes will need to be reached in a clockwise direction, while other remote nodes will need to be reached in a counter-clock-wise direction.

FIG. 2 shows an example of a first solution of a hub node (for example a hub node $10_1$ of FIG. 1), which uses Active Waveguide Multiplexers (AWGs) 29, 31 to multiplex and demultiplex all channels. This example shows twelve channels in a band, with the AWG 29 illustrating how each wavelength or channel within the band is coupled to a west connection of a ring, and the AWG 31 illustrating how each wavelength or channel within the band is coupled to the east connection of the ring. The hub node comprises a plurality of switches 25 (two per channel), for enabling the hub node to switch on a channel by channel basis for protection. Such a system can increase costs, for example because of the number of separate switching devices required. Scaling with such an arrangement can also be restrictive, since the arrangement requires a number of switches equal to twice the number of channels required. Furthermore, such a scheme requires a large amount of separate cabling 27/33 between the AWGs 29/31 and switches 25, and a large amount of cabling 23 between the switches 25 and transceivers 21, as illustrated by FIG. 2.

SUMMARY

It is an aim of the present embodiments to provide a method and apparatus which obviate or reduce at least one or more of the disadvantages mentioned above.

According to a first aspect there is provided a network node for use as a hub node of a network that further comprises one or more remote nodes, wherein the network node is configured to be coupled to at least first and second connections for communication with one or more remote nodes. The network node comprises a first band filter adapted to separate a first aggregated signal comprising a plurality of channel signals into a plurality of band signals. A second band filter and a third band filter are adapted to aggregate a plurality of band signals into a second aggregated signal comprising a plurality of channel signals and a third aggregated signal comprising a plurality of channel signals, respectively. A switching module is adapted to switch on a per-band granularity the plurality of band signals between the first band filter and either the second band filter or the third band filter.

Optionally, the first band filter is adapted to aggregate the plurality of band signals into the first aggregated signal. The second band filter and the third band filter are adapted to separate the second aggregated signal and third aggregated signal, respectively, into the plurality of band signals. The switching module is adapted to switch on a per-band granularity the plurality of band signals between either the second band filter or the third band filter and the first band filter.

Optionally, the first band filter is adapted to separate the first aggregated signal into a plurality of band signals in an add direction, and/or adapted to aggregate the plurality of band signals into the first aggregated signal in a drop direction.

Optionally, the second band filter and/or third band filter is adapted to aggregate the plurality of band signals into the second aggregated signal and third aggregated signal, respectively, in an add direction; and/or adapted to separate the second aggregated signal and third aggregated signal, respectively, into the plurality of band signals in a drop direction.

Optionally, the first band filter, second band filter, third band filter and switching module form part of a protection sub-system within the network node.

Optionally, the network node comprises a multiplexing module adapted to multiplex a plurality of separate channel signals into the first aggregated signal in an add direction, and/or adapted to demultiplex the first aggregated signal into a plurality of separate channel signals in a drop direction.

Optionally, the multiplexing module and first band filter are coupled by a single connection for carrying the first aggregated signal.

Optionally, the single connection comprises an optical fiber or waveguide.

Optionally, a band filter comprises one or more optical components adapted to separate/aggregate two or more band signals from/into an aggregated signal.

Optionally, the network node further comprises a monitoring system for monitoring the failure of a band signal, and controlling the operation of the switching module in response to detecting a band failure.

According to another aspect, there is provided a network node for use as a remote node for adding and/or dropping a band signal with a network, wherein the network node is coupled to at least first and second connections for communication with one or more other network nodes. The network node comprises a channel filter adapted to aggregate on a per-channel granularity a plurality of channel signals into the band signal in an add direction, and/or adapted to separate on a per-channel granularity the band signal into a plurality of channel signals in a drop direction. A first band filter is adapted to filter on a per-band granularity the band signal onto the network via the first connection in an add direction, and/or adapted to filter the band signal from the network via the first connection in a drop direction. A second band filter is adapted to filter on a per-band granularity the band signal onto the network via the second connection in an add direction, and/or adapted to filter the band signal from the network via the second connection in a drop direction. A passive splitting module couples the band signal between the channel filter, first band filter and second band filter.

Optionally, the network node further comprises an express channel adapted to couple the first band filter and the second band filter, wherein the express channel is adapted to allow passage of a plurality of bands of the network, except the band signal being added and/or dropped at the network node.

Optionally, the network node does not comprise any switching devices.

According to another aspect there is provided a method in a network node of a network that further comprises one or more remote nodes, wherein the network node is coupled to at least first and second connections for communication to at least one or more remote nodes. The method comprises separating, using a first band filter, a first aggregated signal comprising a plurality of channel signals into a plurality of band signals. The method comprises aggregating, using a second band filter and a third band filter, a plurality of band signals into a second aggregated signal comprising a plurality of channel signals and a third aggregated signal comprising a plurality of channels, respectively. The method further comprises switching on a per-band granularity the plurality of band signals between the first band filter and either the second band filter or the third band filter.

Optionally, aggregating, using the first band filter, the plurality of band signals into the first aggregated signal comprising a plurality of channel signals; separating, using the second band filter and the third band filter respectively, a plurality of channel signals of a second aggregated signal and a third aggregated signal into a plurality of band signals, and switching on a per-band granularity the plurality of band signals between either the second band filter or the third band filter and the first band filter.

Optionally, further comprising the step of multiplexing a plurality of separate channel signals into the first aggregated signal in an add direction, and/or demultiplex the first aggregated signal into a plurality of separate channel signals in a drop direction.

According to another aspect, there is provided a method in a network node for adding and/or dropping a band signal with a network, wherein the network node is coupled to at least first and second connections for communication with one or more other network nodes. The method comprises aggregating, using a channel filter on a per-channel granularity, a plurality of channel signals into the band signal in an add direction, and/or separating, using the channel filter on a per-channel granularity, the band signal into a plurality of channel signals in a drop direction. The method comprises filtering using a first band filter on a per-band granularity the band signal onto the network via the first connection in an add direction, and/or filtering using the first band filter on a per-band granularity the band signal from the network via the first connection in a drop direction. The method comprises filtering using a second band filter on a per-band granularity the band signal onto the network via the second connection in an add direction, and/or filtering using the second band filter on a per-band granularity the band signal from the network via the second connection in a drop direction. The method further comprises passively splitting the band signal between the channel filter, first band filter and second band filter.

Optionally, coupling, using an express channel, the first band filter and the second band filter, wherein the coupling comprises passing a plurality of bands of the network, except the band signal being added and/or dropped at the network node. 19. A system comprising a network node as claimed in any one of claims 1 to 10 and one or more network nodes as claimed in any one of claims 11 to 13.

According to another aspect there is provided a system comprising a network node as described herein and defined in the appended claims for use as a hub node, and one or more network nodes as described herein and defined in the appended claims for use as a remote node.

Optionally, the system comprises a fronthaul system, and/or wherein the network node of any example comprises a hub node connected to a baseband processing unit, and/or wherein the one or more network nodes of any example comprise remote nodes coupled to one or more remote radio units, RRUs.

BRIEF DESCRIPTION OF THE DRAWINGS

For a better understanding of examples of the present embodiments, and to show more clearly how the examples may be carried into effect, reference will now be made, by way of example only, to the following drawings in which.

DETAILED DESCRIPTION

Figure 1:
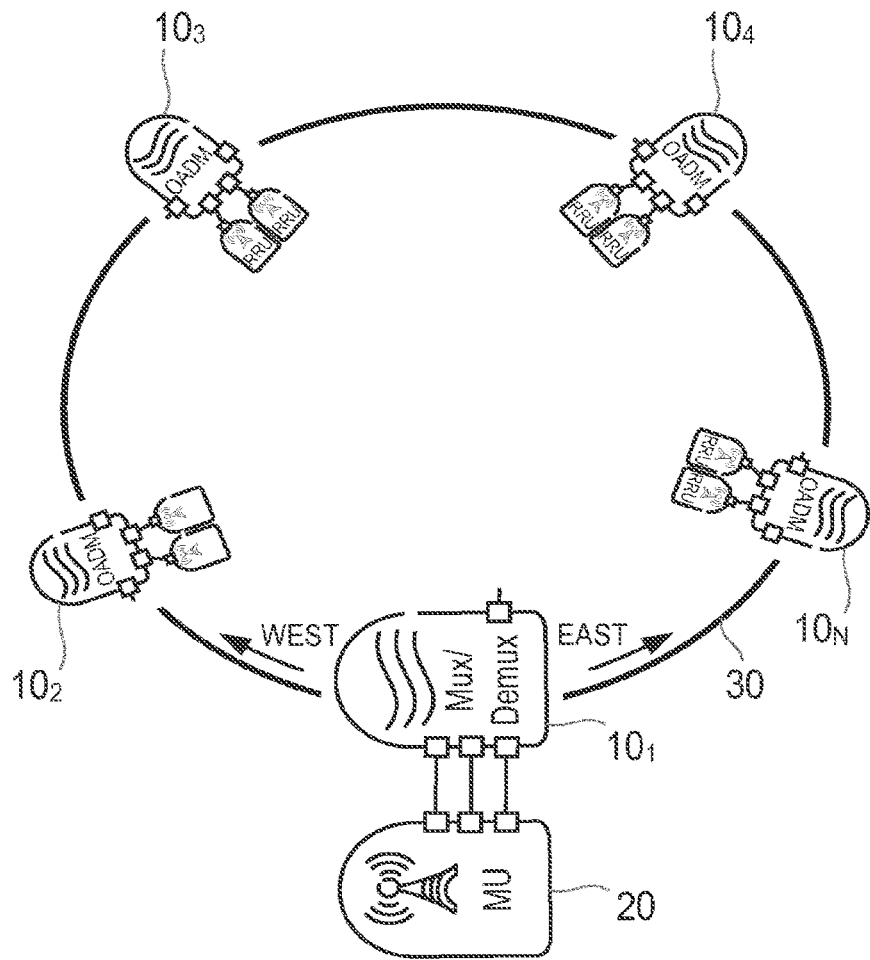
FIG. 1 shows an example of a ring network according to a general prior art arrangement.

The following sets forth specific details, such as particular embodiments for purposes of explanation and not limitation. But it will be appreciated by one skilled in the art that other embodiments may be employed apart from these specific details. In some instances, detailed descriptions of wellknown methods, nodes, interfaces, circuits, and devices are omitted so as not obscure the description with unnecessary detail.

It is noted that, while certain examples will be described below in the context of a Dense Wavelength Division Multiplexing (DWDM) physical layer technology, the embodiments may also be used with other physical layer technologies, including for example Wavelength Division Multiplexing (WDM) more generally, other WDM physical layer technologies such as Coarse Wavelength Division Multiplexing (CWDM), or indeed any other form of technology.

Also, while the embodiments will be described in relation to single-fiber bi-directional transmission (i.e. whereby a single fiber is provided for transmitting a first plurality of channels in one direction, and a second plurality of channels in the other direction, e.g. a set of optical wavelengths being used to transmit a group of channels in one direction, and another set of optical wavelengths being used to transmit a group of channels in another direction), the examples may also be used with systems in which a separate fiber is used for each direction.

Reference will also be made in the embodiments and examples below to a channel or channel signal. Each channel or channel signal corresponds to a particular wavelength of an optical signal, which is used as an optical channel for carrying a particular signal. In a bi-directional single-fiber system, first and second wavelengths (i.e. first and second channels or channel signals) can be used to deliver a single service (one wavelength for an upstream direction of that service, and one wavelength for a downstream direction of that service). It is noted that an upstream direction within a particular node may correspond to a direction in which data or signals are being added to a network (such as a ring network) via that node, while a downstream direction within a particular node may correspond to a direction in which data or signals are being dropped from a network (such as a ring network) via that node.

Reference will also be made in the embodiments and examples below to a band or band signal. Each band or band signal may comprise a plurality of channels or channel signals as described above. The plurality of channels (or channel signals) within a band (or band signal) may comprise a sub set of wavelengths (>1) from the whole set of wavelengths that are available within the system, for example a sub set from the whole of the DWDM system channels. The system uses a plurality of bands or band signals to communicate between nodes. Thus, the plurality of channels are divided into at least two bands or band signals. A band or band signal may comprise a sub set of consecutive wavelengths, although it is noted that a band or band signal may alternatively comprise a sub set of non-adjacent wavelengths.

Reference is also made herein to an aggregated signal. An aggregated signal may also comprise all wavelengths (or channels), or a sub set of wavelengths from the whole set of wavelengths that are available within the system, for example a sub set from the whole of the DWDM system channels. In some examples, the aggregated signal comprises a plurality of wavelength division multiplexed optical channels. For example, if the system in the example of FIG. 1 were to comprise an aggregated signal having 48 channels (whereby the 48 channels are a sub set from a larger number of available DWDM system channels), the 48 channels may be split for example into 4 bands, each band comprising a sub set of 12 channels. In such an example, each remote node $10_2$ to $10_N$ may be configured to operate in a specific wavelength band, such that each remote node $10_2$ to $10_N$ adds/drops a particular band to/from the ring network 30. The hub node $10_1$ in the example of FIG. 1 is adapted to add/drop all bands to the ring network 30. It is noted that the embodiments and examples described herein may comprise any number of channels, and any number of bands. The bands may comprise the same number or channels, or may comprise different numbers of channels, or a mixture thereof.

Reference is also made herein to filtering or switching on a per-channel granularity. It is noted that per-channel granularity means that the filtering or switching is performed on an individual channel level.

Reference is also made herein to filtering or switching on a per-band granularity. It is noted that per-band granularity means that the filtering or switching is performed on a band level. Thus, a band is switched or filtered as a single entity.

Figure 2:
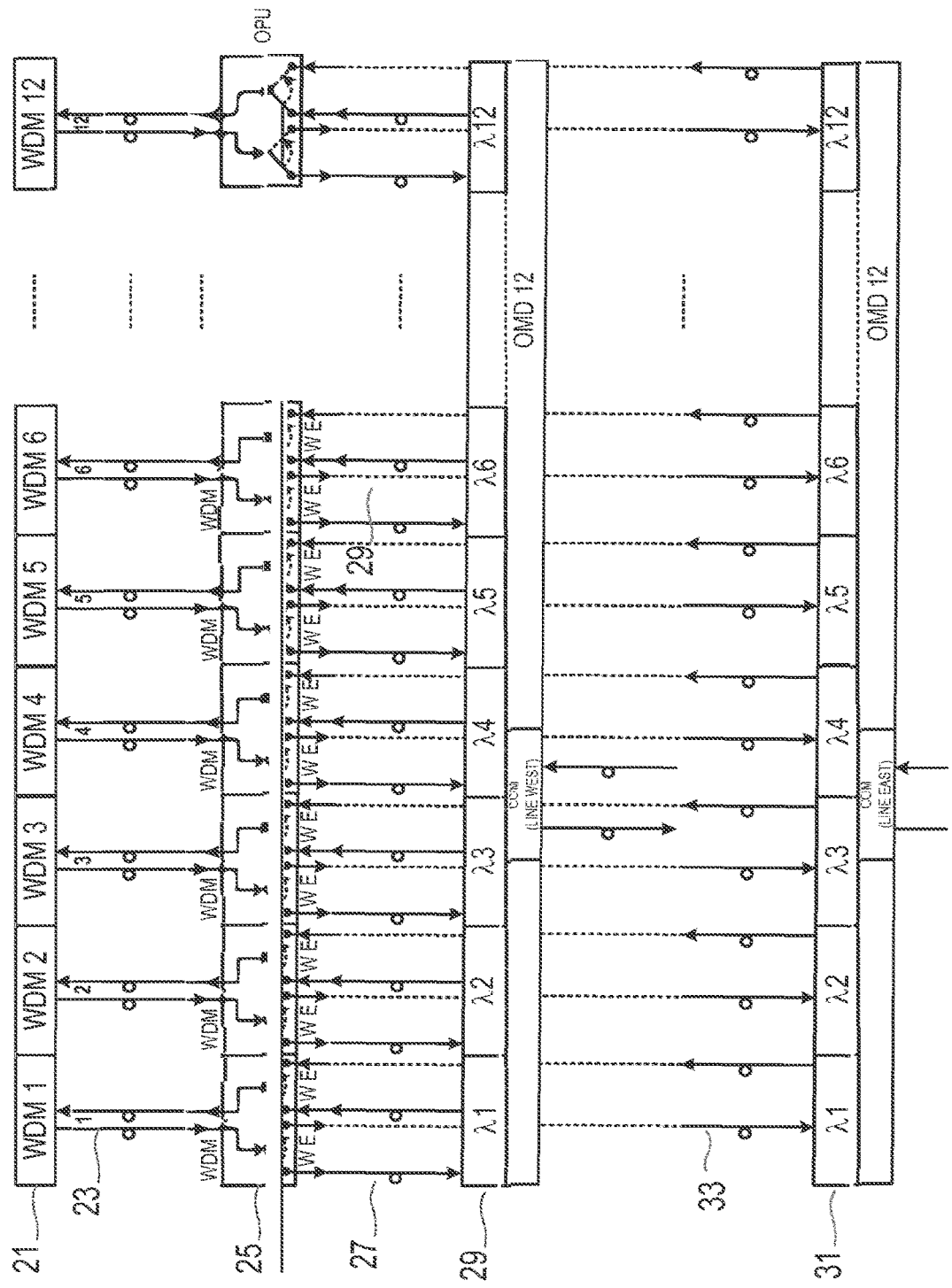
FIG. 2 shows an example of a hub node according to a prior art arrangement.

As mentioned in the background section, the hub node shown in the example of FIG. 2 has the disadvantage of requiring a large number of individual switching devices, and also a large amount of connections between various components of the hub node.

Figure 3:
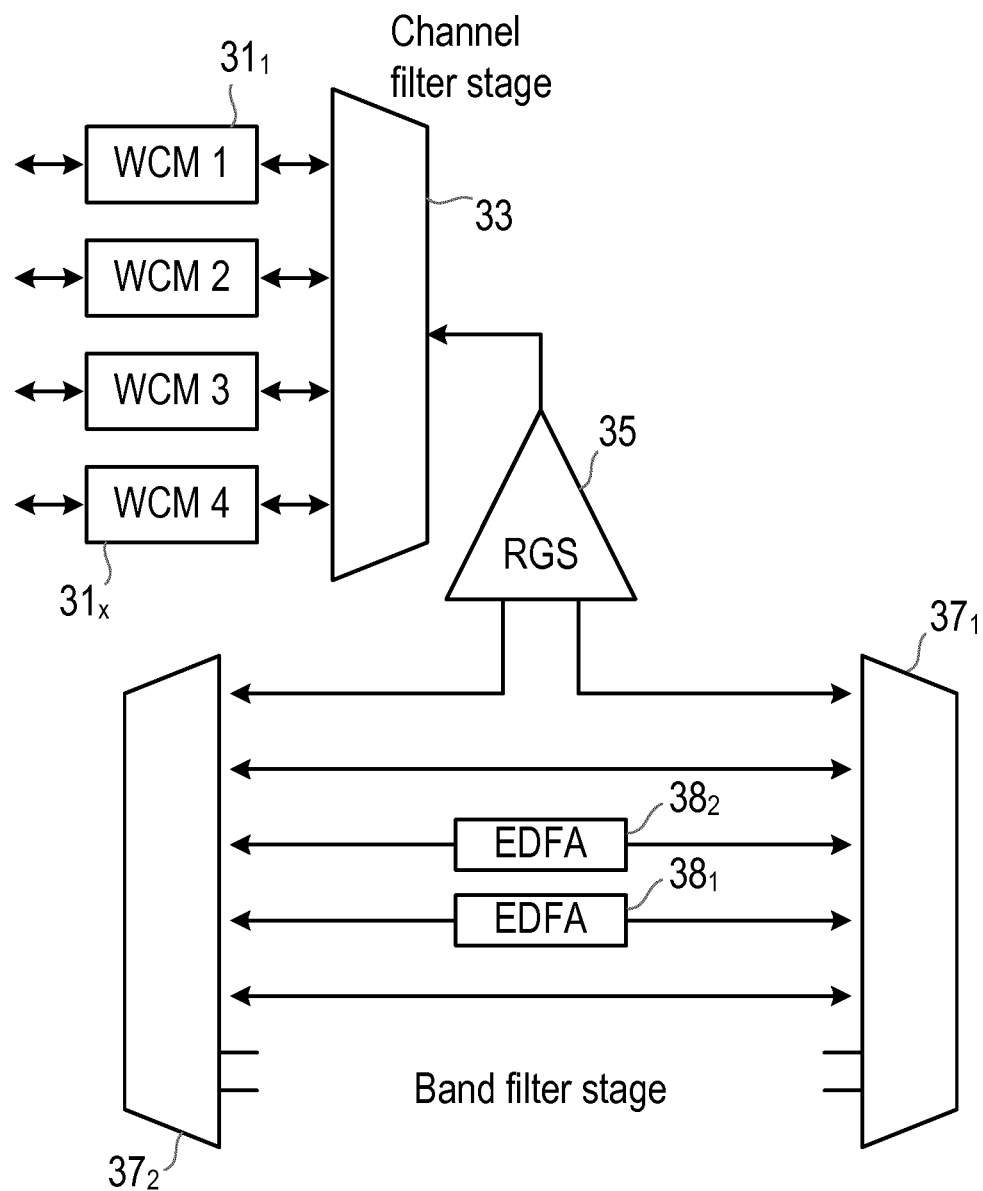
FIG. 3 shows an example of a network node.

FIG. 3 shows an alternative arrangement to that of FIG. 2, which makes use of band filters to switch per-band instead of per-channel, which may be used in Optical Add Drop Multiplexer (OADM) nodes. The arrangement of FIG. 3 comprises two band filters $37_1$, $37_2$ that switch on a per-band basis, one per ring direction, one switch 35 and one channel filter stage 33 which Adds/Drops on a per-channel basis (to combine the local channels $31_1$ to $31_x$). FIG. 3 also shows optical repeater devices 38, for example Erbium-doped fiber amplifiers (EDFAs) 38 within the band filter stage.

Such an arrangement has a reduced number of switching devices compared to the example of FIG. 2. However, while such an arrangement may be used in a ring with all OADM nodes only (i.e. without a hub node), the use of add/drop multiplexers/demultiplexers within the channel filter stage 33 does not scale well if such a scheme is applied to a hub node, where all the bands need to be added and dropped via a hub node. In such an arrangement as shown in FIG. 3, the cost is linear with the number of channels (in view of the number of Optical Add Drop, OAD, channel filters being equal to the number of bands M).

Furthermore, although the amount of cabling is somewhat reduced compared to FIG. 2, such an arrangement still requires a separate connection for each band. It is also noted that having active switches on remote sites (i.e. if the node of FIG. 3 is used as a remote node on a ring) is also not particularly desired. This is because the failure of such switching devices at remote nodes can be costly and difficult to repair.

The embodiments described below propose network nodes, for example for use as a hub node or a remote node in a network such as a ring network, which are more suited to the cost and simplicity requirements of an access network. In some of the embodiments that will be described below, the network nodes of a network are based on having switches (i.e. the switch gear) at the main site (hub node), while the remote nodes are passive.

Figure 4:
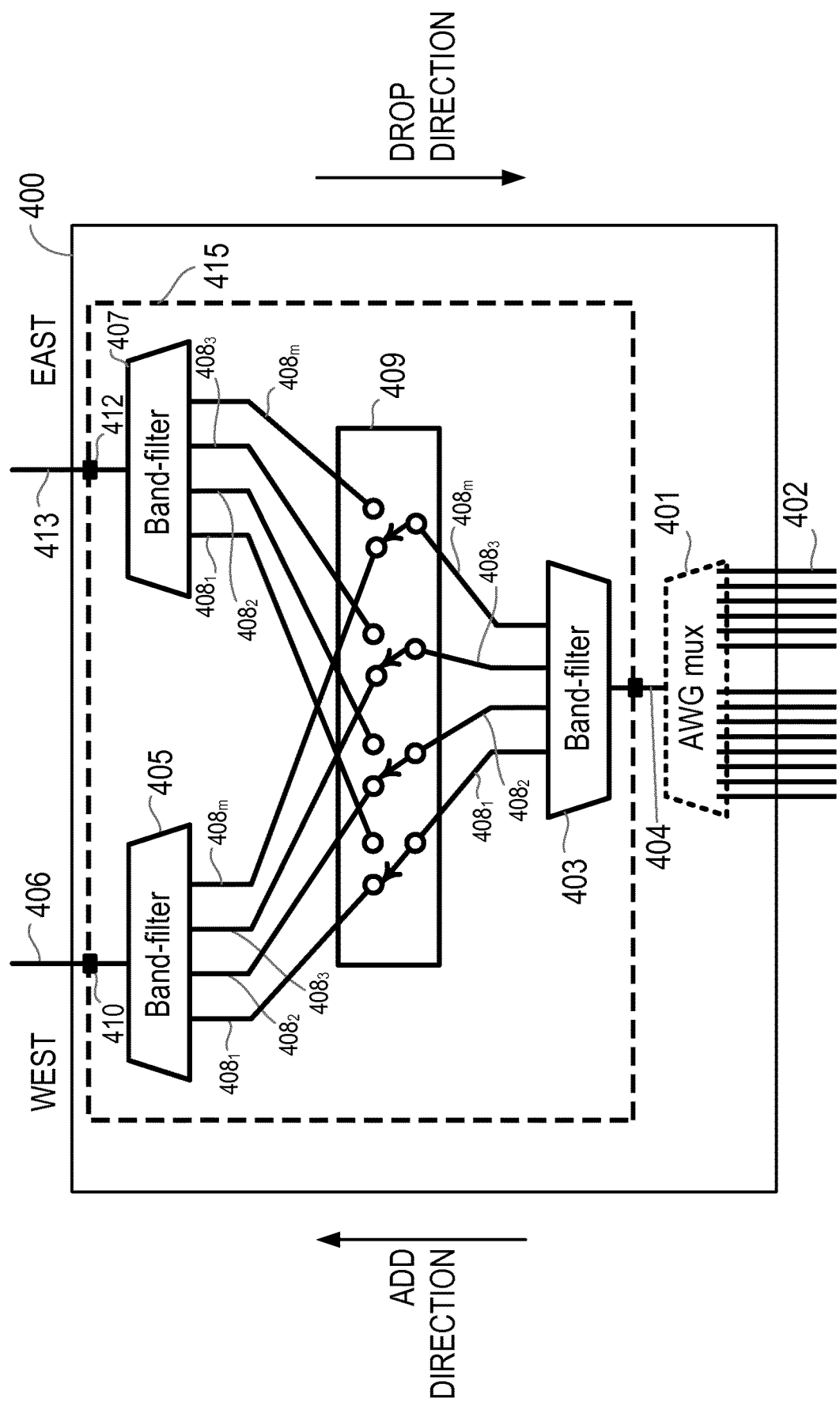
FIG. 4 shows an example of a network node according to an embodiment.

FIG. 4 shows an example of a network node 400 according to an embodiment, for use as a hub node of a network that comprises one or more remote nodes, wherein the network node is coupled to at least first and second connections, 410, 412 for communication with one or more remote nodes. The network may comprise for example a ring network, or a mesh network. The first and second connections 410, 412 may correspond for example to "east" and "west" directions of a ring network. The network node 400 comprises a first band filter 403 adapted to separate a first aggregated signal 404 comprising a plurality of channel signals into a plurality of band signals $408_1$ to $408_M$. The first aggregated signal 404 comprises all of the channel signals for adding or dropping, in either direction.

The network node 400 further comprises a second band filter 405 and a third band filter 407. The second band filter 405 and third band filter 407 are adapted to aggregate a plurality of band signals $408_1$ to $408_M$ into a second aggregated signal 406 comprising a plurality of channel signals and a third aggregated signal 413 comprising a plurality of channel signals, respectively. The second aggregated signal 406 and third aggregated signal 413 comprises all of the channel signals for adding or dropping, in either direction, via the respective first and second connections 410, 412.

The first, second or third band filters may be considered as having an input or an output at a band granularity. The other of the input or output may be an aggregated signal (i.e. comprising a plurality of bands) or at a channel granularity. The band filter is configured to aggregate or separate bands of channels, e.g. aggregate a plurality of bands (received in a band granularity) or separate channels into a plurality of band granularity outputs.

The network node 400 further comprises a switching module 409. The switching module 409 is adapted to switch on a per-band granularity the plurality of band signals $408_1$ to $408_M$ between the first band filter 403 and either the second band filter 405 or the third band filter 407. The switching module 409 may be considered as configured to switch at a band granularity level or a per-band granularity. As such, the optical channels of a band are switched together as a band.

The network node 400 may be configured such that the first band filter 403 is adapted to aggregate the plurality of band signals $408_1$ to $408_M$ into the first aggregated signal, with the second band filter 405 and a third band filter 407 being adapted to separate the second aggregated signal 410 and third aggregated signal 412, respectively, into the plurality of band signals $408_1$ to $408_M$. The switching module 409 may be adapted to switch on a per-band granularity the plurality of band signals $408_1$ to $408_M$ between either the second band filter 405 or the third band filter 407 and the first band filter 403.

It is noted that the band filters described herein may be bi-directional, or comprise separate band filter elements for aggregating a plurality of band signals into an aggregated signal in one direction, and separating an aggregated signal into a plurality of band signals in another direction.

It is also noted that in an application where a single fiber, for example, is used to transmit signals in both directions (i.e. bi-directional communication on the same fiber), in some embodiments each band can add and/or drop. For example, in a six channel band three channels may be added and three channels dropped, whereby two channels (i.e. wavelengths) provide one bidirectional service. For example, adjacent wavelengths may be used for such a pair of channels, although it is noted that non-adjacent wavelengths may also be used. It is also noted that in other embodiments, different bands can be used for add and drop, for example whereby some bands are used for adding and other bands used for dropping.

In other embodiments (not shown), separate fibers may be used to transmit in different directions.

In some embodiments, the first band filter 403, second band filter 405, third band filter 407 and switching module 409 form part of a protection sub-system 415 within the network node 400.

The network node 400 may comprise a multiplexing module 401 adapted to multiplex a plurality of separate channel signals 402 into the first aggregated signal 404 in an add direction (i.e. the add direction corresponding to a direction in which signals are added onto either the first, e.g. west, or second, e.g. east connection of the network), and/or adapted to demultiplex the first aggregated signal 404 into a plurality of separate channel signals 402 in a drop direction (i.e. the drop direction corresponding to a direction in which signals are dropped from either the first, e.g. west, or second, e.g. east, connection of the network).

The multiplexing module 401 may comprise, for example, an Array Wave Guide Multiplexer (AWG). In such an embodiment the use of the AWG can make the network node cost insensitive to the number N of channels, and can be significantly cheaper (e.g. at full capacity) than using separate add/drop filters.

In one example the first band filter 403 is adapted to separate the first aggregated signal 404 into a plurality of band signals $408_1$ to $408_M$ in an add direction, and/or adapted to combine a plurality of band signals $408_1$ to $408_M$ into the first aggregated signal 404 in a drop direction. The first aggregated signal 404 comprises all channels used between the hub node and remote nodes.

In one example the second band filter 405 is adapted to aggregate the plurality of band signals $408_1$ to $408_M$ into the second aggregated signal 406 in an add direction; and/or adapted to separate the second aggregated signal 406 into the plurality of band signals $408_1$ to $408_M$ in a drop direction.

In one example the third band filter 407 is adapted to aggregate the plurality of band signals $408_1$ to $408_M$ into the third aggregated signal 413 in an add direction; and/or adapted to separate the third aggregated signal 413 into the plurality of band signals $408_1$ to $408_M$ in a drop direction.

It is noted that the first connection 410 with the network may comprise what is sometimes referred to as a "west" connection to the network, for example a ring network, while the second connection 412 may comprise what is sometimes referred to as an "east" connection to the network, for example a ring network. The west and east connections enable the network node 400 to direct communications to a particular remote node via either the first or second connections to that node, for example in either direction around a ring network (i.e. clockwise or anticlockwise, respectively), for example depending upon which section of the ring network is damaged or faulty. Likewise, the west and east connections enable the network node 400 to receive communication signals from a remote node via either the west connection or east connection, again depending upon which section of the ring network is damaged or faulty.

The switching module 409 may be adapted to switch the plurality of band signals $408_1$ to $408_M$ between the first band filter 403 and either the second band filter 405 or the third band filter 407, i.e. depending upon which of the first or second connections 410, 412, and hence which direction around the ring network, the band signals are to be communicated.

In the embodiments described above, the multiplexing module 401 and first band filter 403 may be coupled by a single connection, for example a single physical connection, for carrying the aggregated signal 404 which comprises the plurality of channel signals. For example, the single connection may be provided using a single optical fiber or waveguide. In a similar manner, the second band filter 405 may be coupled via a single fiber or waveguide to the ring network, and the third band filter 407 also coupled to the ring network via a single fiber or waveguide. This has an advantage of providing simplified cabling at the network node (e.g. hub node or main site), both in terms of capital expenditure (CAPEX) requirements and operational expenditure (OPEX) requirements. The reduced number of switching devices within the switching module also has the advantage of reducing costs.

It is noted that one or more of the band filters in FIG. 4 may comprise one or more optical components adapted to separate/aggregate two or more band signals from/into an aggregate signal. The internal configuration of a band filter may be customized for a particular application.

In the embodiment described above it can be seen that, to help reduce the hub node cost and to help solve the cabling issue, a multiplexing module (e.g. AWG 401) is used to multiplex all the channels together, with back-to-back band filters being used to separate again the aggregated signals into the required bands, and with the switching being performed at the per-band granularity level only. In some embodiments an operator may have only three fibers to connect in such an arrangement: one fiber from the AWG 401 to the protection sub-system 415, and the two fibers from the protection sub-system 415 to the west and east lines of the network.

Figure 5:
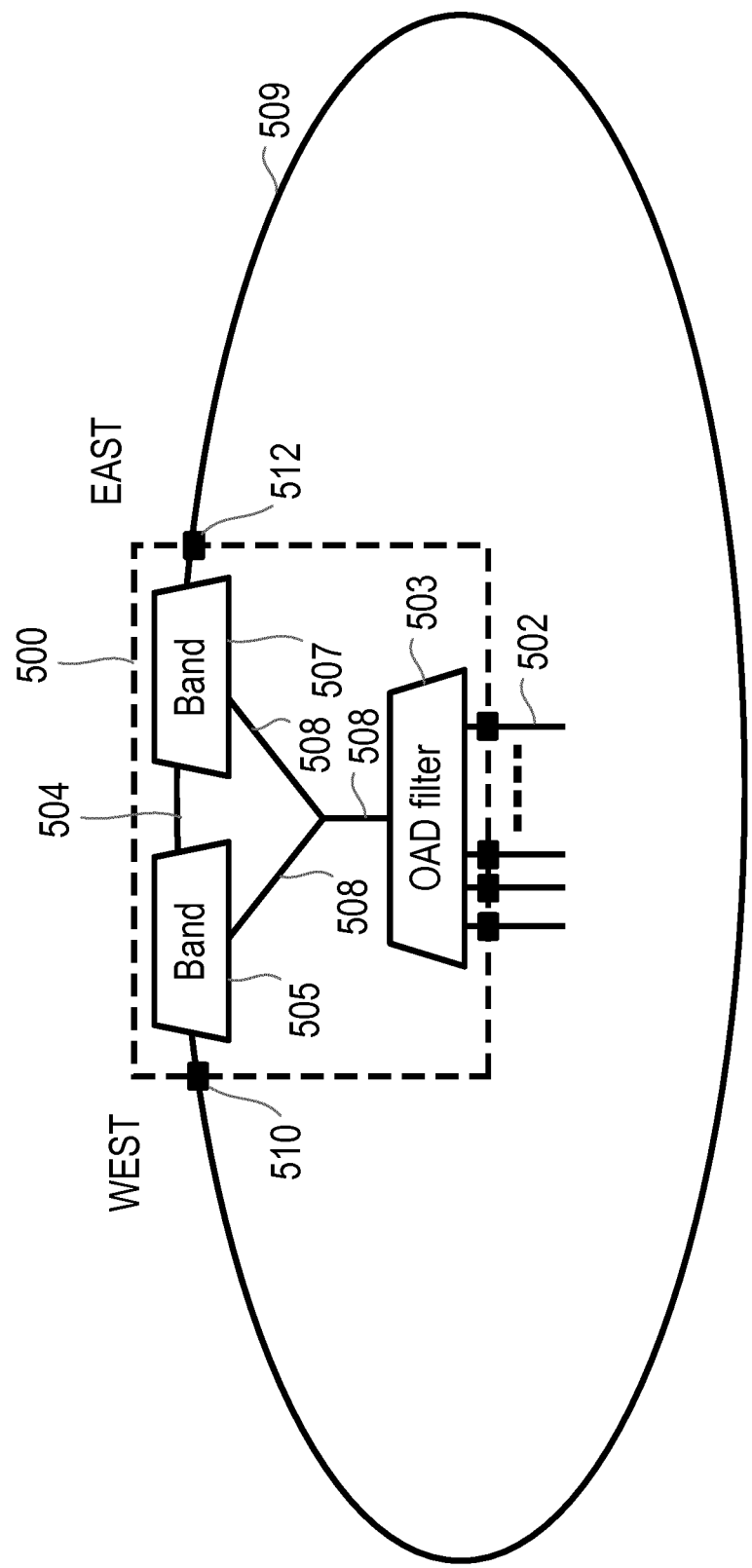
FIG. 5 shows an example of a network node according to an embodiment.

FIG. 5 shows an example of a network node 500 according to another embodiment, for use as a remote node for adding and/or dropping a band signal with a network 509. The network node is coupled to at least first and second connections 510, 512 for communication with one or more other network nodes over the network 509. For example, the first and second connections 510, 512 comprise for example west and east connections of a ring network. As such the first connection carries channel signals to/from a first direction, e.g. west or anti-clockwise for a ring. The second connection carries channel signals to/from a second direction, e.g. east or clockwise for a ring. The network 509 may be a bidirectional ring network as described. It is noted that a remote node 500 may comprise for example a node that is coupled to one or more Remote Radio Units, RRUs. It is also noted that the one or more other nodes may comprise a hub node, for example a hub node as described for coupling to a baseband processing unit.

The network node 500 comprises a channel filter 503 adapted to aggregate on a per-channel granularity a plurality of channel signals 502 into a band signal in an add direction, and/or adapted to separate on a per-channel granularity a band signal into a plurality of channel signals 502 in a drop direction. In this respect the channel filter 503 acts to either combine wavelengths/channels into a common aggregated signal at one port of the channel filter 503, or to separate wavelengths/channels to different ports of the channel filter 503. The add direction corresponds to a unit, e.g. a remote radio unit, connected to the remote network node 500 and adding a signal to the network 509 (e.g. optical fiber ring). The drop direction is the opposite direction, i.e. from the network 509 to the output of the remote node 500, e.g. for a RRU.

The network node 500 further comprises a first band filter 505 adapted to filter on a per-band granularity the band signal onto the network 509 via the first connection 510 in an add direction, and/or adapted to filter the band signal from the network 509 via the first connection 510 in a drop direction. In other words, when adding/dropping a band, the first band filter 505 acts as a filter that passes the band(s) (group of channels) to be added/dropped to/from the network 509, i.e. the first band filter 505 acts as a band-pass filter. As will be described below, the first band filter 505 may also be adapted to divert other bands.

The network node further comprises a second band filter 507 adapted to filter on a per-band granularity the band signal onto the network 509 via the second connection 512 in an add direction, and/or adapted to filter the band signal from the network via the second connection 512 in a drop direction. As above, when adding/dropping a band, the second band filter 507 acts as a filter that lets pass the band(s) (group of channels) to be added/dropped to/from the network 509, i.e. the second band filter 507 acts as a band-pass filter. As will be described below, the second band filter 507 may also be adapted to divert other bands.

The network node 500 further comprises a passive splitting module 508 for coupling the band signal between the channel filter 503, first band filter 505 and second band filter 507.

It can be seen that, compared for example with the arrangement shown in FIG. 3, the network node of the embodiment of FIG. 5 does not comprise any switching devices for adding/dropping bands. In other words, the network node 500 is a passive node, which is therefore suited for application as a remote node, for example a remote node in association with a hub node, in a network such as a ring network. The hub node and one or more remote nodes may provide for fronthaul communication between a baseband processing unit and one or more RRU.

The network node 500 may further comprise an express channel 504 adapted to couple the first band filter 505 and the second band filter 507. The express channel 504 is adapted to allow passage of the plurality of bands of the network 509, except the band signal being added and/or dropped at the network node. As such, the express channel 504 enables the plurality of channels or the plurality of bands on the network 509 to pass via the network node 500, while allowing a particular band signal to be added or dropped at that network node 500. As mentioned above, the first band filter 505 and second band filter 507 can therefore be adapted to divert bands, except the band being added or dropped at the network node, to the express channel 504.

In one example, the network node 500 is a passive structure comprising an optical add/drop (OAD) filter 503, a splitter and first and second band filters 505,507 integrated into a single device.

It is noted that one or more remote nodes as described above in FIG. 5 may be coupled to a hub node as described above in FIG. 4. It is also noted, however, that one or more remote nodes, for example a first ring node, may be co-located with a hub node.

According to another embodiment, there is provided a system comprising a network node as described above in relation to FIG. 4, and one or more network nodes as described above in relation to FIG. 5. In an example where all remote nodes are of the type described in FIG. 5, such a system has all of the switching devices (i.e. switching gear) located in the main or hub node corresponding to a network node 400 of FIG. 4, for example the switching gear being within a self-confined protection sub-system 415 placed at the main (hub) site.

In the embodiments described above, the use of a banded system helps reduce the number of switches compared with the arrangement of FIG. 2, but the channels are not multiplexed on a per-band basis like in the arrangement shown in FIG. 3, but with a full AWG multiplexer and then separated again with a band-filter placed back-to-back. This can have benefits both from a capital expenditure viewpoint and an operational expenditure viewpoint.

From a capital expenditure saving viewpoint, the embodiments help reduce the cost of a hub network node. In particular, the hub multiplexing structure cost is independent from the number of channels N (e.g. with a 48 channel AWG costing approximately the same as two 6 channel OADs only).

For comparison, the example below provides a cost benchmarking between the arrangements of FIGS. 2 and 3, compared with the arrangement of FIG. 4, for a 48 channel system (which may correspond to providing 24 Common Public Radio Interface, CPRI, services).

If it is assumed that "U" is an arbitrary unit cost corresponding to the cost of a 6 channel OAD (6 channel chosen as the example in view of this modularity being well suited to radio equipment which are based on triplets of antennas).

If N is the total number of channels and M the number of bands, the component costs for the arrangements of FIGS. 2 and 3 are as follows:
OAD (6chs): U
AWG: 2 U (approximately. independent on the number of channels N)
Band Filter (e.g. 8 bands): 1.6 U
Switch: U
The cost of the arrangement of FIG. 2 comprises:

$$N*\text{Switch}+2\times \text{AWG}=NU+4U=U(N+4)$$

The cost of the arrangement of FIG. 3 comprises:

$$M \times \text{Switch} + 2 \times BF^*(M/8) + N \times OAD/6 =$$
$$MU + 0.4 \times MU + NU/6 = (1.4M + N/6)U$$

The cost of the arrangement of FIG. 4 comprises:

$$M \times \text{Switch} + 1 \times AWG + 3 \times BF^*(M/8) =$$
$$MU + 2U + 0.6 \times MU = (1.6M + 2)U$$

Hence, for a typical scenario with the number of channels N=48 and the number of bands M=4, the comparative costs are as follows:
Arrangement of FIG. 2=52 U
Arrangement of FIG. 3=13.6 U
Arrangement of FIG. 4=8.4 U From the above it can be seen that the arrangement of FIG. 2 is heavily penalized by the high number of switches. However, the embodiment of FIG. 4 shows a cost saving of approximately 38% even against the arrangement of FIG. 3, because of the combination of band filters and the AWG.

Similar cost savings may be found in an application where the number of bands M=8 bands, where the cost saving is about 30%.

It is noted that, in the examples and embodiments described herein with reference to FIG. 4, the first, second and third band filters may be realized as a single multiport device to further reduce costs.

The embodiments and examples described herein also help reduce operational expenditure.

For example, first, a single cable can be used at the protection input regardless of the number of channels.

The protection sub-system of the embodiment of FIG. 4 is a self-confined subsystem with only 3 ports, as for a line protection unit of a point-to-point link. This allows for the same simple configuration and installation rules for all topologies. This helps simplify commissioning and reduce errors. It can also help simplify inventory (e.g. use of AWG for all topologies). It can also allow a compact front-plate and a small form factor module for easy integration in the whole system.

As mentioned above, in some embodiments described herein the switches are all located in the main site. Remote sites use a splitter to send the wavelengths in both ring directions. This helps reduce risk of failures at the remote sites where maintenance can be more troublesome due to being outdoors, or because of other constraints at the remote location.

Figure 6A:
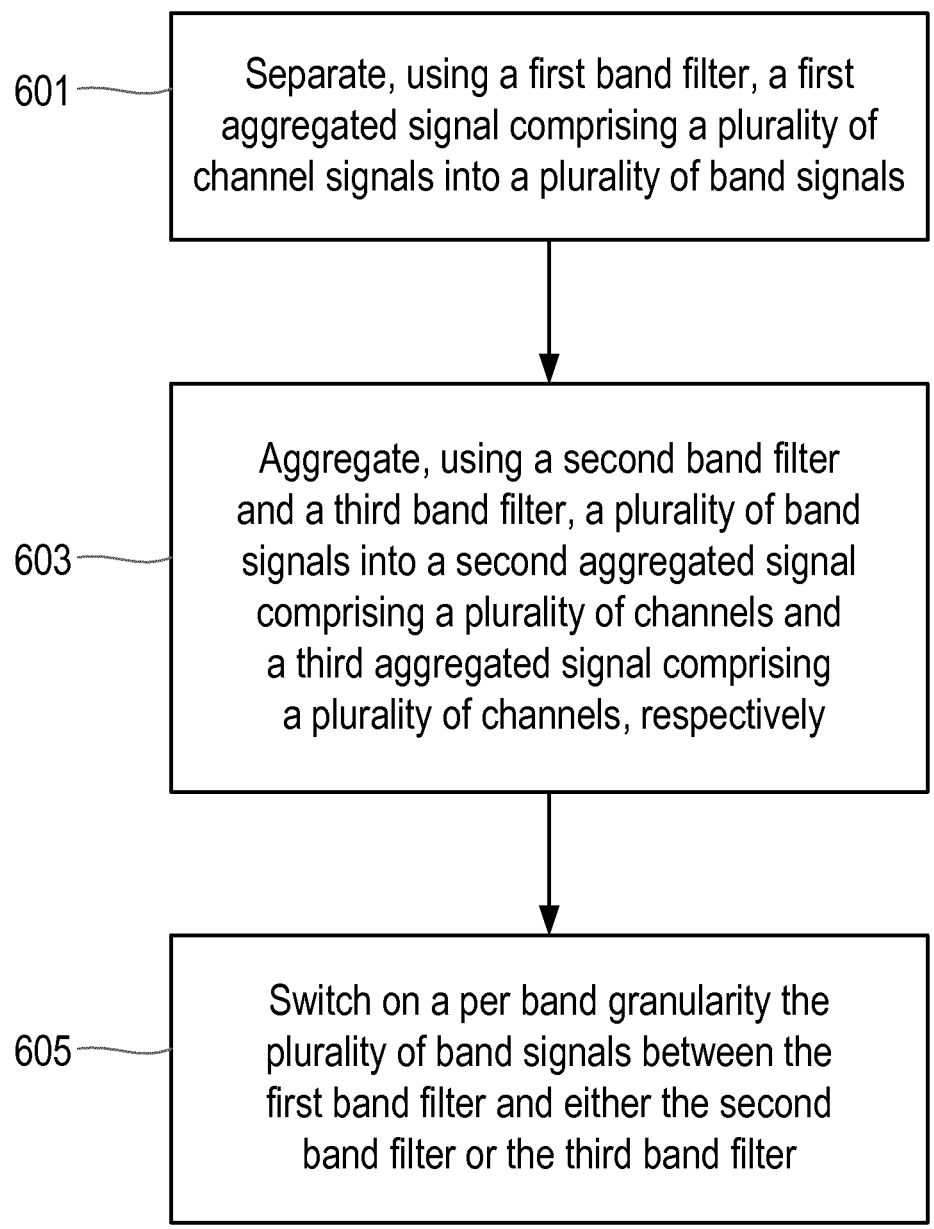
FIG. 6a shows an example of a method according to an embodiment.

FIG. 6a shows a method according to another embodiment, the method being in a network node of a network that further comprises one or more remote nodes, and wherein the network node is coupled to at least first and second connections for communication with one or more remote nodes. The network node may comprise for example a hub node. The network may comprise for example a ring network, or a mesh network. The method comprises separating, using a first band filter, a first aggregated signal comprising a plurality of channel signals into a plurality of band signals, step 601.

The method further comprises aggregating, using a second band filter and a third band filter, a plurality of band signals into a second aggregated signal comprising a plurality of channel signals and a third aggregated signal comprising a plurality of channel signals, respectively, step 603.

The method also comprises switching on a per-band granularity the plurality of band signals between the first band filter and either the second band filter or the third band filter, step 605. This method corresponds to an add direction.

The steps 601,603,605 may not carried out in the order shown, since the switching 605 on a per-band granularity occurs after the separating 601 at the first band filter into a plurality of band signals, and before the aggregation 603 of the bands at the second and third band filters.

Figure 6B:
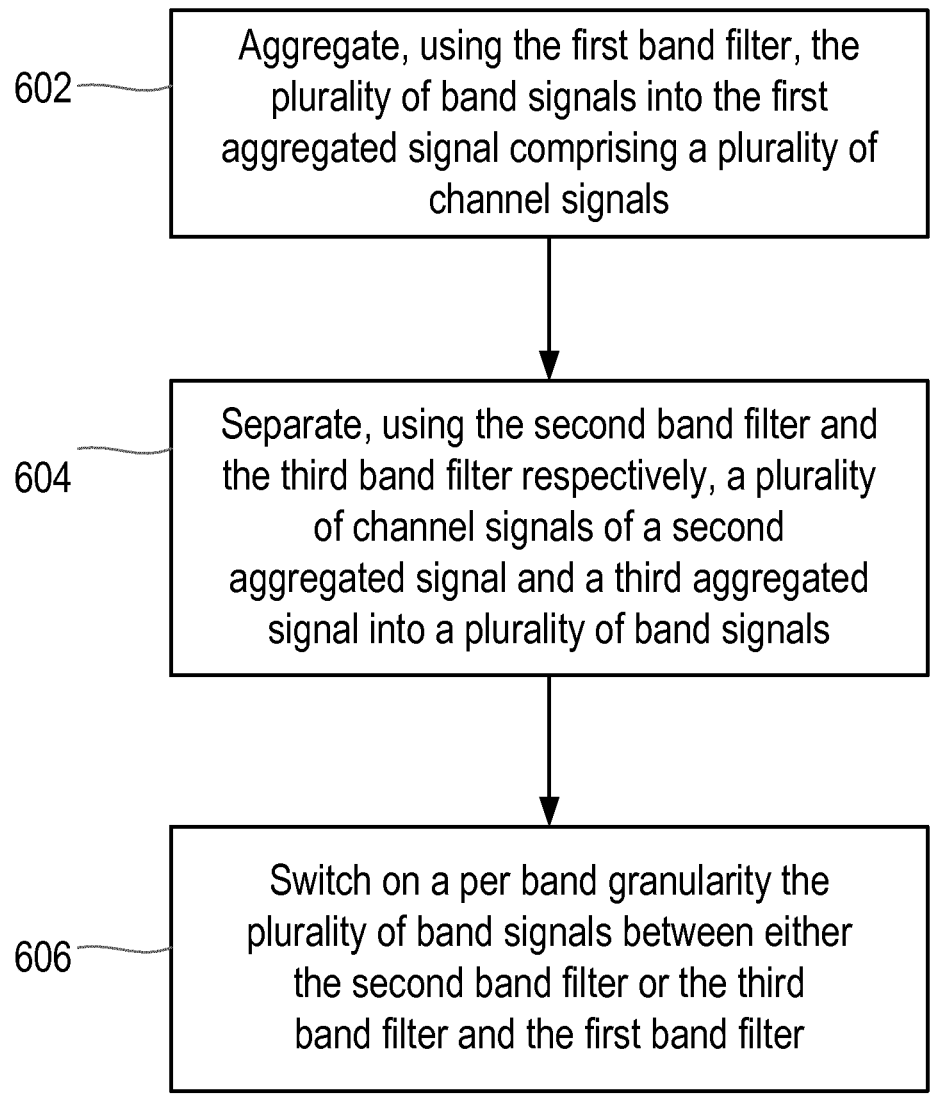
FIG. 6b shows an example of a method according to an embodiment.

FIG. 6b shows an example of a method according to another embodiment, whereby the method comprises aggregating, using the first band filter, the plurality of band signals into the first aggregated signal comprising a plurality of channel signals, step 602. The method comprises separating, using the second band filter and the third band filter respectively, a plurality of channel signals of a second aggregated signal and a third aggregated signal into a plurality of band signals, step 604, and switching on a per-band granularity the plurality of band signals between either the second band filter or the third band filter and the first band filter, step 606. This method corresponds to a drop direction.

The steps 602,604,606 may not carried out in the order shown, since the switching 606 on a per-band granularity occurs after the separating 604 at the second and third band filters into a plurality of band signals, and before the aggregating 602 of the bands at the first band filter.

In one embodiment the method further comprises the step of multiplexing a plurality of separate channel signals into the first aggregated signal in an add direction, and/or demultiplex the first aggregated signal into a plurality of separate channel signals in a drop direction. For example, this multiplexing and/or demultiplexing is carried out by the AWG 401.

Figure 7:
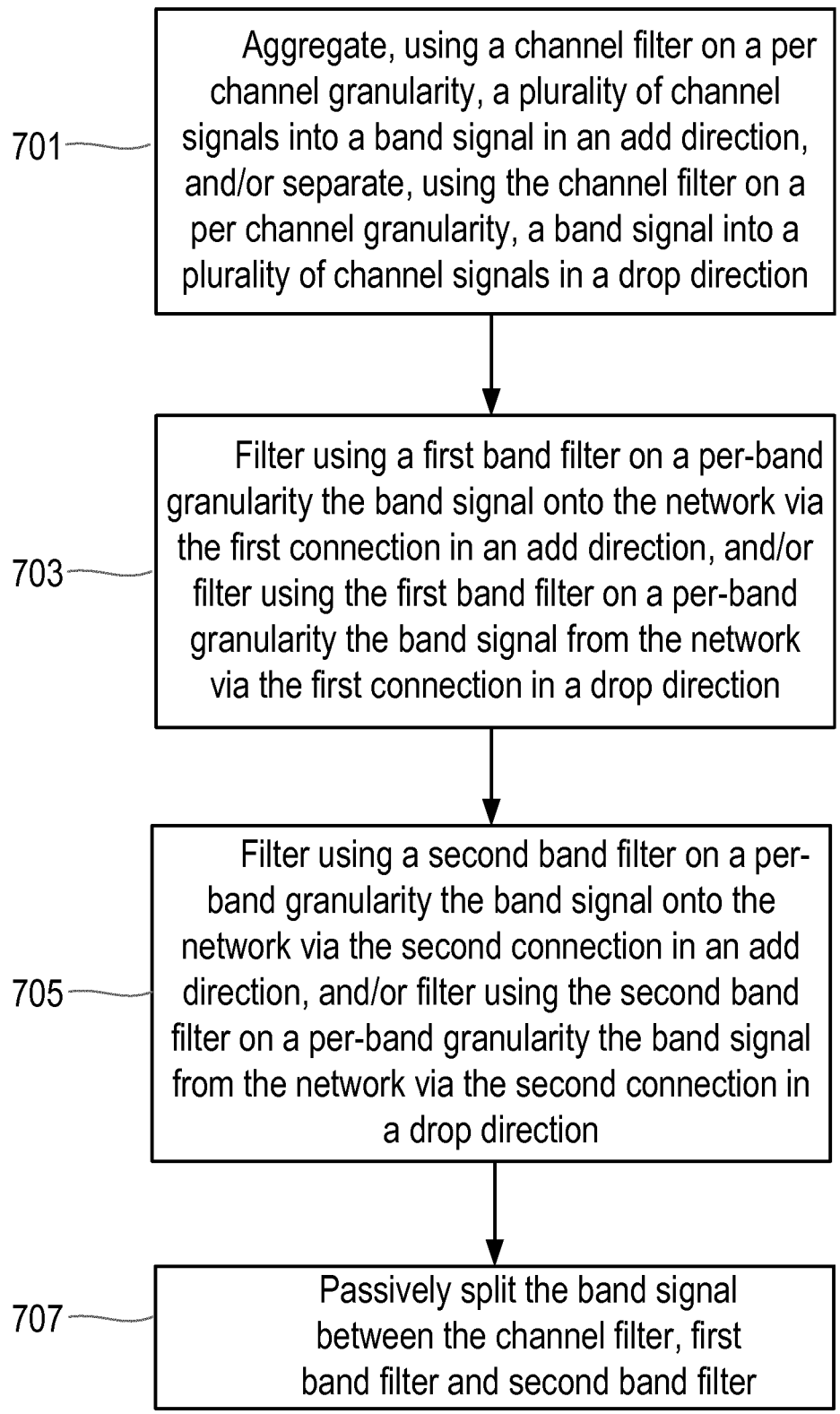
FIG. 7 shows an example of a method according to another embodiment.

FIG. 7 shows an example, according to another embodiment, of a method in a network node for adding and/or dropping a band signal with a network, wherein the network node is coupled to at least a first connection and second connection for communication with at least one or more other network nodes. The network node may comprise for example a remote node. In some examples, the node only adds and/or drops a particular (e.g. fixed) band signal. The network may comprise for example a ring network or a mesh network.

The method comprises aggregating, using a channel filter on a per-channel granularity, a plurality of channel signals into the band signal in an add direction, and/or separating, using the channel filter on a per-channel granularity, the band signal into a plurality of channel signals in a drop direction, step 701.

The method further comprises filtering using a first band filter on a per-band granularity the band signal onto the network via the first connection in an add direction, and/or filtering using the first band filter on a per-band granularity the band signal from the network via the first connection in a drop direction, step 703.

The method further comprises filtering using a second band filter on a per-band granularity the band signal onto the network via the second connection in an add direction, and/or filtering using the second band filter on a per-band granularity the band signal from the network via the second connection in a drop direction, step 705. As mentioned earlier, filtering a band signal in an add direction or a drop direction comprises allowing the band signal (group of channels) to pass though the filter, and stopping other bands from passing through the band filter, i.e. acting as a band-pass filter.

The method further comprises passively splitting the band signal between the channel filter, first band filter and second band filter, step 707.

The steps 701,703,705,707 may not carried out in the order shown. For example, the passive splitting 707 occurs after the aggregation 701 and before the filtering (combining) 703,705 of the bands at the first band filter with other bands carried by the network 509. Alternatively, the passive splitting 707 occurs after the filtering (splitting) 703,705 of band(s) from the network 509, and before the separating 701 of the bands at the channel filter 503.

The filtering described for FIG. 7 and the remote node may alternatively be considered as either combining or splitting channel signals. The band filters are configured to combine or split at a per-band granularity.

In one embodiment, the method of FIG. 7 further comprises the step of coupling, using an express channel, the first band filter and the second band filter, wherein the coupling comprises passing a plurality of bands of the network, except the band signal being added and/or dropped at the network node.

According to another embodiment there is provided a system comprising a network node as described in relation to FIG. 4 (hub node) herein or defined in claims 1 to 10 below, and one or more network nodes (remote nodes) as described in relation to FIG. 5 herein or defined in claims 11 to 13 below. The system may comprise a radio access network fronthaul system. The optical fronthaul system connects parts of a distributed base station. The network node of FIG. 4 and claims 1 to 10 may comprise a hub node connected to a baseband processing unit. The one or more network nodes of FIG. 5 and claims 11 to 13 may comprise remote nodes coupled to one or more remote radio units, RRUs.

In the embodiments and examples described herein, the per-band switching by the switching module may be triggered in response to a failure, for example in response to a failure being detected on a given band by a monitoring system. Thus, a network node as described above in connection with FIG. 4 may further comprise a monitoring system for monitoring the failure of a band signal, and controlling the operation of the switching module in response to detecting a band failure.

Figure 8:
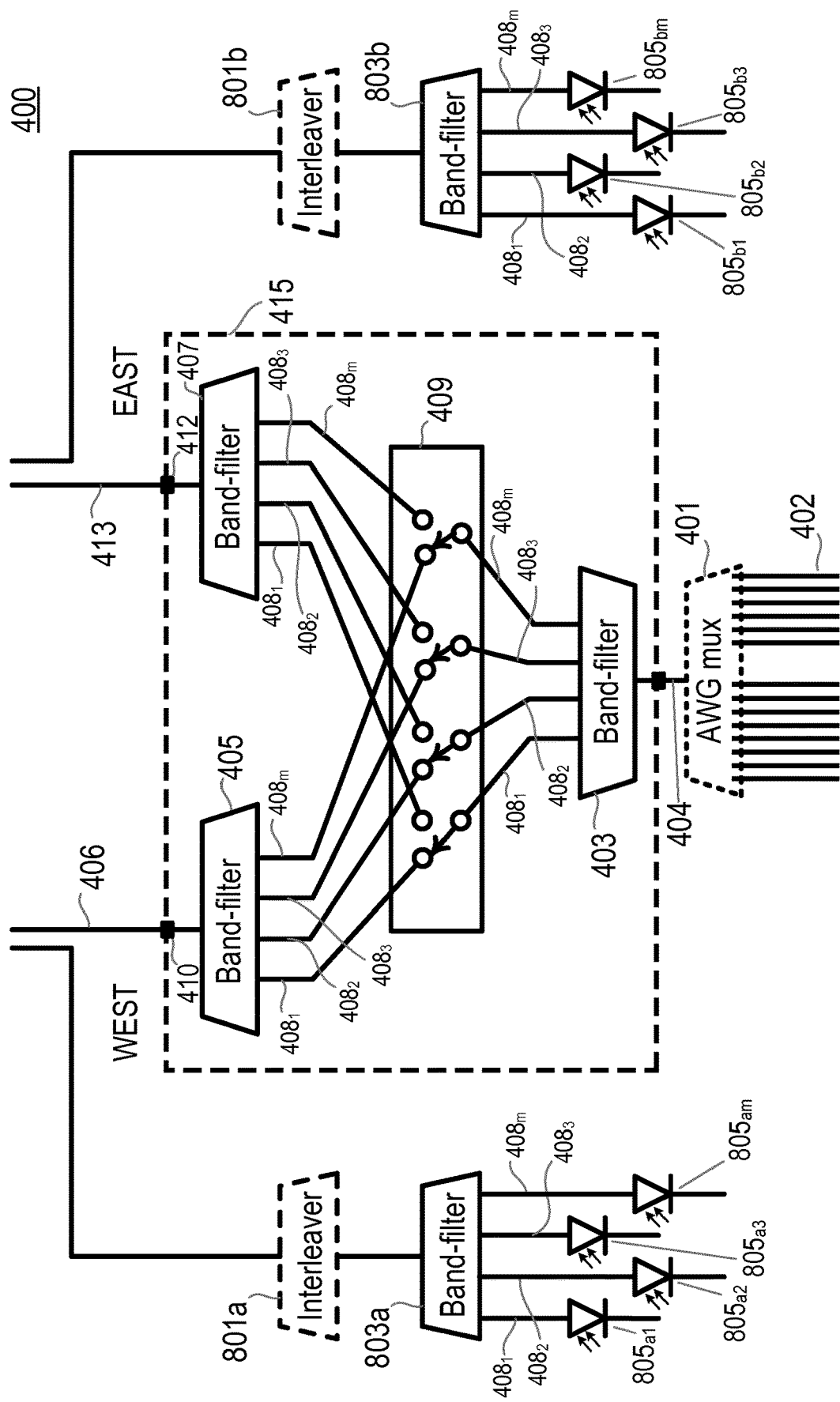
FIG. 8 shows an example of a network node according to another embodiment.

FIG. 8 illustrates an example of a per-band monitoring system that can be used to detect a band failure, and to trigger per-band switching by a switching module. The network node 400 of FIG. 8 corresponds to that of FIG. 4, and comprises an AWG 401, a first band filter 403, a second band filter 405, a third band filter 407 and a switching module 409.

In this example a monitoring system for triggering the operation of the switching module 409 comprises a band filter 803*a* that is adapted to separate the aggregated signal 406 into a plurality of band signals $408_1$ to $408_M$. A plurality of monitoring units $805_{a1}$ to $805_{aM}$ are provided for monitoring a failure of a respective band signal $408_1$ to $408_M$. The plurality of monitoring units $805_{a1}$ to $805_{aM}$ may comprise, for example, a plurality of photodiodes. In response to one of the monitoring units $805_{a1}$ to $805_{aM}$ detecting a failure of a respective band signal $408_1$ to $408_M$, this triggers the switching of the switching module 409, for example to switch on a per-band basis to use another connection, for example the east connection instead of the west connection. In a system in which a single fiber is used for bidirectional communication, with adjacent wavelengths within a band being used for upstream and downstream communication, an interleaver unit 801*a* may be coupled between the band filter 803*a* and the connection to the second aggregated signal 406 (corresponding to a west connection on a ring network). It is noted that such an interleaver unit 801*a* may not be necessary in a system in which upstream and downstream communication is provided in different bands, The monitoring system comprises corresponding components coupled to monitor the third aggregated signal 413 (corresponding in this example to the east connection on a ring network). As such, a plurality of monitoring units $805_{b1}$ to $805_{bM}$ are provided for monitoring a failure of a respective band signal $408_1$ to $408_M$. The plurality of monitoring units $805_{b1}$ to $805_{bM}$ may comprise, for example, a plurality of photodiodes. In response to one of the monitoring units $805_{b1}$ to $805_{bM}$ detecting a failure of a respective band signal $408_1$ to $408_M$, this triggers the switching of the switching module 409, for example to switch on a per-band basis to use another connection, for example the west connection instead of the east connection. A band filter 803*b* is adapted to separate the aggregated signal 406 into a plurality of band signals $408_1$ to $408_M$. As above, an interleaver unit 801*b* is optional depending upon how the upstream and downstream communication is realized.

The embodiments described herein have an advantage of providing a reduced cost solution for access networks (e.g. Front haul access networks). The optical network described may alternatively be used for any optical network, e.g. for backhaul, aggregation or a metro network. For example, as seen from the examples described earlier, some embodiments can provide 30 to 40% cost saving with respect to prior art techniques. The embodiments also have the advantage of providing simplified cabling at the main site, i.e. the main network node or hub node, for example corresponding to that of FIG. 4. The completely passive remote nodes also provide greater reliability and help reduce costs. The hub node comprises the only active switch. This provides for efficient communication between a hub node and one or more remote nodes.

The embodiments are also suitable for both single and double fiber operation. That is, although the embodiments and examples above have been described with reference to single-fiber bidirectional implementation, the examples and embodiments can also be applied to two-fiber bidirectional transmission (with even more cost saving).

It is noted that, while some of the embodiments have been described in the context of a system in which the switch gear (e.g. switching module 409) is based at the main (hub) site only, while all the remote nodes are passive only, e.g. using passive splitters, it is noted that one or more of the remote nodes may comprise a non-passive node. In other words, the network node described in the example of FIG. 4, while capable of being used in combination with a remote node as described in FIG. 5, may also be used with other types of remote node. Likewise, the remote node described in FIG. 5 may also be used with other types of hub node.

The network nodes and protection subsystems described above, e.g. for DWDM access rings, have the advantage of being low cost in view of the reduced number of switches used, and the low number of connections. Access and Front Haul networks are very cost-sensitive, and the examples described above therefore help minimize device cost (CAPEX), while also being compatible with single-fiber transmission. They provide a simple solution that can be easy to install and to maintain, and which can also be self-confined, i.e. no interaction between the switching subsystems and other equipment (e.g. radio equipment). The remote nodes based on passive components also make maintenance more efficient.

It is noted that while the description above and the appended claims define certain steps in a particular order, it is noted that these steps are not necessarily performed in that specific order.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A network node for use as a hub node of a network that further comprises one or more remote nodes, wherein the network node is configured to be coupled to at least first and second connections for communication with one or more remote nodes, the network node comprising:
a multiplexing module adapted to multiplex a plurality of separate channel signals into a first aggregated signal in an add direction, and/or adapted to demultiplex the first aggregated signal into a plurality of separate channel signals in a drop direction;
a first band filter adapted to separate the first aggregated signal comprising a plurality of channel signals into a plurality of band signals, wherein the multiplexing module and first band filter are coupled by a single connection for carrying the first aggregated signal;
a second band filter and a third band filter adapted to aggregate a plurality of band signals into a second aggregated signal comprising a plurality of channel signals, and a third aggregated signal comprising a plurality of channel signals, respectively; and
a switching module adapted to switch on a per-band granularity the plurality of band signals between the first band filter and either the second band filter or the third band filter.

2. A network node as claimed in claim 1 wherein:
the first band filter is adapted to aggregate the plurality of band signals into the first aggregated signal;
the second band filter and the third band filter are adapted to separate the second aggregated signal and third aggregated signal, respectively, into the plurality of band signals; and
the switching module is adapted to switch on a per-band granularity the plurality of band signals between either the second band filter or the third band filter and the first band filter.

3. A network node as claimed in claim 1, wherein the first band filter is adapted to separate the first aggregated signal into a plurality of band signals in an add direction, and/or adapted to aggregate the plurality of band signals into the first aggregated signal in a drop direction.

4. A network node as claimed in claim 1, wherein the second band filter and/or third band filter is adapted to aggregate the plurality of band signals into the second aggregated signal and third aggregated signal, respectively, in an add direction; and/or adapted to separate the second aggregated signal and third aggregated signal, respectively, into the plurality of band signals in a drop direction.

5. A network node as claimed in claim 1, wherein the first band filter, second band filter, third band filter and switching module form part of a protection sub-system within the network node.

6. A network node as claimed in claim 1, wherein the single connection comprises an optical fiber or waveguide.

7. A network node as claimed in claim 1, wherein a band filter comprises one or more optical components adapted to separate/aggregate two or more band signals from/into an aggregated signal.

8. A network node as claimed in claim 1, further comprising a monitoring system for monitoring the failure of a band signal, and controlling the operation of the switching module in response to detecting a band failure.

9. A system comprising a network node as claimed in claim 1, a remote network node for adding and/or dropping a band signal with the network, wherein the network node is coupled to at least first and second remote network node connections for communication with one or more other network nodes, the remote network node comprising:
a channel filter adapted to aggregate on a per-channel granularity a plurality of channel signals into the band signal in an add direction, and/or adapted to separate on a per-channel granularity the band signal into a plurality of channel signals in a drop direction;
a first remote network node band filter adapted to filter on a per-band granularity the band signal onto the network via the first remote network node connection in an add direction, and/or adapted to filter the band signal from the network via the first remote network node connection in a drop direction;
a second remote network node band filter adapted to filter on a per-band granularity the band signal onto the network via the second remote network node connection in an add direction, and/or adapted to filter the band signal from the network via the second remote network node connection in a drop direction; and a passive splitting module for coupling the band signal between the channel filter, first remote network node band filter and second remote network node band filter.

10. A system as claimed in claim 9, wherein the system comprises a fronthaul system.

11. A network node for use as a remote node for adding and/or dropping a band signal with a network, wherein the network node is coupled to at least first and second connections for communication with one or more other network nodes, the network node comprising:
- a channel filter adapted to aggregate on a per-channel granularity a plurality of channel signals into a band signal in an add direction, and/or adapted to separate on a per-channel granularity the band signal into a plurality of channel signals in a drop direction;
- a first band filter adapted to filter on a per-band granularity the band signal onto the network via the first connection in an add direction, and/or adapted to filter the band signal from the network via the first connection in a drop direction;
- a second band filter adapted to filter on a per-band granularity the band signal onto the network via the second connection in an add direction, and/or adapted to filter the band signal from the network via the second connection in a drop direction; and
- a passive splitting module for coupling the band signal between the channel filter, first band filter and second band filter.

12. A network node as claimed in claim 11, further comprising:
- an express channel adapted to couple the first band filter and the second band filter, wherein the express channel is adapted to allow passage of a plurality of bands of the network, except the band signal being added and/or dropped at the network node.

13. A network node as claimed in claim 11, wherein the network node does not comprise any switching devices.

14. A method in a network node of a network that further comprises one or more remote nodes, wherein the network node is coupled to at least first and second connections for communication with one or more remote nodes, the method comprising:
- multiplexing a plurality of separate channel signals into a first aggregated signal in an add direction, and/or adapted to demultiplex the first aggregated signal into a plurality of separate channel signals in a drop direction;
- separating, using a first band filter, the first aggregated signal comprising a plurality of channel signals into a plurality of band signals;
- aggregating, using a second band filter and a third band filter, a plurality of band signals into a second aggregated signal comprising a plurality of channel signals and a third aggregated signal comprising a plurality of channels, respectively, and
- switching on a per-band granularity the plurality of band signals between the first band filter and either the second band filter or the third band filter.

15. A method as claimed in claim 14 further comprising:
- aggregating, using the first band filter, the plurality of band signals into the first aggregated signal comprising a plurality of channel signals;
- separating, using the second band filter and the third band filter respectively, a plurality of channel signals of a second aggregated signal and a third aggregated signal into a plurality of band signals, and
- switching on a per-band granularity the plurality of band signals between either the second band filter or the third band filter and the first band filter.

16. A method in a network node for adding and/or dropping a band signal with a network, wherein the network node is coupled to at least another network node via at least first and second connections, the method comprising:
- aggregating, using a channel filter on a per-channel granularity, a plurality of channel signals into a band signal in an add direction, and/or separating, using the channel filter on a per-channel granularity, the band signal into a plurality of channel signals in a drop direction;
- filtering using a first band filter on a per-band granularity the band signal onto the network via the first connection in an add direction, and/or filtering using the first band filter on a per-band granularity the band signal from the network via the first connection in a drop direction;
- filtering using a second band filter on a per-band granularity the band signal onto the network via the second connection in an add direction, and/or filtering using the second band filter on a per-band granularity the band signal from the network via the second connection in a drop direction; and
- passively splitting the band signal between the channel filter, first band filter and second band filter.

17. A method as claimed in claim 16, further comprising:
- coupling, using an express channel, the first band filter and the second band filter, wherein the coupling comprises passing a plurality of bands of the network, except the band signal being added and/or dropped at the network node.

* * * * *

UNITED STATES PATENT AND TRADEMARK OFFICE
CERTIFICATE OF CORRECTION

PATENT NO. : 10,819,459 B2  
APPLICATION NO. : 16/088404  
DATED : October 27, 2020  
INVENTOR(S) : Roberto Magri et al.

Page 1 of 1

It is certified that error appears in the above-identified patent and that said Letters Patent is hereby corrected as shown below:

On the Title Page

"(72) Inventors: Roberto Magri, Pisa (IT); Alberto Deho, Genoa (IT)"  
Should read:  
-- (72) Inventors: Roberto Magri, Pisa (IT); Alberto Deho, Genova (IT) --

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*